June 12, 1962 V. C. ANDERSON 3,039,094

DIGITAL PHASING APPARATUS

Filed July 27, 1960 8 Sheets-Sheet 1

V. C. ANDERSON, INVENTOR.

June 12, 1962 V. C. ANDERSON 3,039,094

DIGITAL PHASING APPARATUS

Filed July 27, 1960 8 Sheets-Sheet 2

V. C. ANDERSON, INVENTOR.

June 12, 1962 V. C. ANDERSON 3,039,094

DIGITAL PHASING APPARATUS

Filed July 27, 1960 8 Sheets-Sheet 3

V. C. ANDERSON, INVENTOR.

DIGITAL PHASING APPARATUS

Filed July 27, 1960 8 Sheets-Sheet 4

V. C. ANDERSON, INVENTOR.

V. C. ANDERSON, INVENTOR.

V. C. ANDERSON, INVENTOR.

June 12, 1962 V. C. ANDERSON 3,039,094

DIGITAL PHASING APPARATUS

Filed July 27, 1960 8 Sheets-Sheet 7

V. C. ANDERSON, INVENTOR.

June 12, 1962 V. C. ANDERSON 3,039,094

DIGITAL PHASING APPARATUS

Filed July 27, 1960 8 Sheets-Sheet 8

V. C. ANDERSON, INVENTOR.

United States Patent Office 3,039,094

Patented June 12, 1962

3,039,094

DIGITAL PHASING APPARATUS

Victor C. Anderson, San Diego, Calif., assignor to The Regents of the University of California, a corporation of California Filed July 27, 1960, Ser. No. 45,662
9 Claims. (Cl. 343—113)

Figure 1:
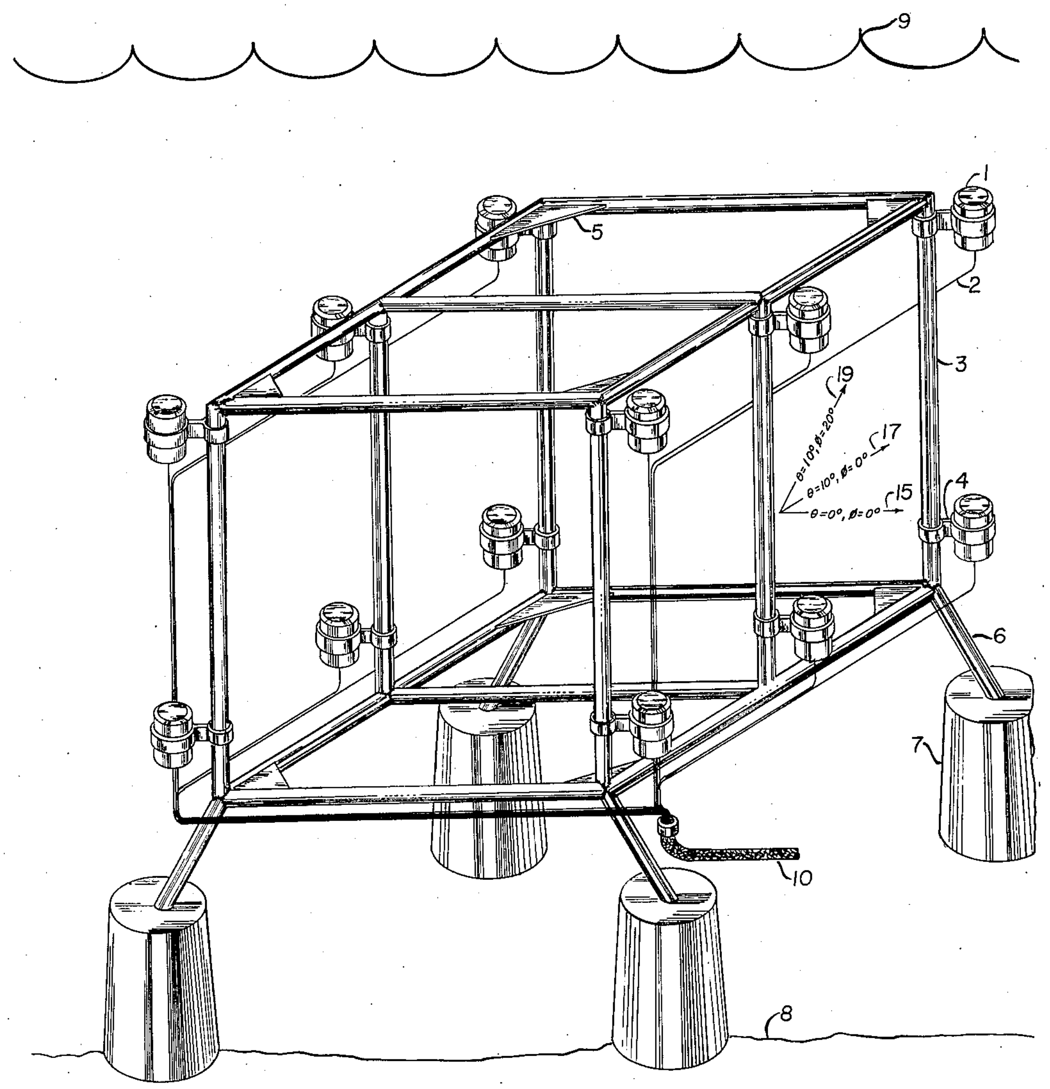

This invention relates to direction finding apparatus and more particularly to apparatus capable of combining arrays of multiple pick-ups in an energy field to enhance the output for specific directions of arrival and suppress the output caused by waves arriving from undesired directions.

Such arrays are used in communication, detection and exploration systems in airborne and waterborne sound fields, seismic vibrational energy fields and in electromagnetic fields. The particular embodiment to be described applies to the use of an array as an underwater sound detection system. The general principle and the apparatus described is applicable in all the above mentioned fields.

In order to provide a preferred direction of reception from an array of pick-up elements, it is necessary to introduce compensating time delays from each element of the array so that the total time delay of the sum of the travel time to the element from the energy source, located in the desired direction, to this additional time delay would be equal for all element outputs. When this is accomplished the signal at the output of each delay line will match each of the others in phase, and the power of the electrical sum of all these outputs then will be equal to the power of the arithmetical sum of the outputs of each individual element. Assuming equal outputs, the power would then be equal to the power output of an individual element multiplied by the square of the number of elements. On the other hand, if a sound wave arrives from a source located at some other direction, the phasing will now be improper for the individual outputs and the signals will add in a more or less random manner, depending on the exact time structure of the signal and its autocorrelation function. The power output of the random sum is equal to the output of an individual element multiplied by the number of elements.

This introduction of time delay or phasing of the array has been accomplished in the past by the use of LC delay lines and also by the use of dynamic delay lines such as a magnetic or dielectric recorder. In the case of the LC delay lines one common method is to use a single delay line which provides sufficient delay for the maximum travel time which can occur within the array dimensions. The outputs of the individual elements of the array then are introduced at suitable taps on the delay line so that the time delay between that tap and the end of the delay line is the required compensating time delay. The output of the delay line then consists of the sum of all of the elements each having had a proper time delay introduced.

This technique has several disadvantages, one being that it is difficult to adjust the propagation velocity of the delay line, i.e., the time delay per tap to accommodate changes in the velocity of the medium in which the array is located.

Another disadvantage is that only a single bearing output may be observed with this system at any one time. This is a particular disadvantage in the case of detection systems where it is essential to observe the arrivals from various bearings for as long a period of time as possible in order to obtain maximum detectability in the presence of an obscuring background noise. If plural bearing outputs are to be observed with this technique, a separate delay line must be provided for each bearing and, as can be appreciated, such a multiple beam system becomes quite bulky and expensive.

The use of magnetic or dielectric recorders also has its disadvantages in that a different recording track must be provided for each element of the array and a large number of playback heads must be used to provide the complexity of time delays required to phase the array for a full set of multiple preformed beams. Also, this method, as well as the LC delay line method, has a practical disadvantage in that it is difficult to maintain an accurate balance in the different output channels because of the extreme requirements on attentuation of the delay line, the accuracy of the mixing networks, on recording reproducibility, etc.

It is therefore an object of the present invention to provide direction finding apparatus which is capable of a plural bearing read-out, and which is unusually simple, compact and inexpensive in that the apparatus eliminates the need for a large number of electromagnetic delay lines or for a multiple channel, multiple play-back recorder in order to achieve a multiple beam system.

A further object is to provide apparatus in accordance with the last object which has a high stability and reliability particularly with respect to variations in component characteristics.

A related object is to provide apparatus capable of simple delay line adjustments to accommodate variations in the array environment.

A still further object is to provide digital array steering apparatus whereby the output is proportional to the signal-to-noise ratio of the energy field instead of being proportional to the absolute intensity of either the signal or the noise.

Other objects will be more readily understood with reference to the ensuing descriptions and claims.

The present invention is based upon the principle that the polarity of a band-limited signal contains nearly as much information as the complete analog signal itself. The operation of dividing the signal into two classes as determined by their polarity is referred to as the operation of dichotomy, and a time series consisting of two possible voltage states representing the two polarity classes of the dichotomized signal is referred to as the clipped signal. The circuit which performs this dichotomy is referred to as either a clipper or a clipping amplifier. It is also based upon the principle that a band-limited signal may be represented by a sequence of individual amplitude samples providing the sampling rate is equal to or greater than twice the highest frequency in the signal. These two principles have been combined in a broad general principle in this invention which permits the incoming signal at each element to be represented by a set of binary digits, i.e., a sequence of polarity samples, each sample being assigned a value of $-1$ or $+1$, depending on the polarity of the incoming signal at the sampling instant. The validity of the principle is dependent upon the actual statistical nature of the background noise rather than the nature of the signal as long as the signal power is small compared to the total received noise or interference power as is the case of interest in detection systems. For signal powers large compared to the noise or interference power, the statistical nature of the signal is the determining factor in the degree of validity of the principle. Having applied this principle it is now possible to incorporate the digital technology used widely in the construction of digital computers to provide the required time delay for phasing this array rather than the less reliable analog types described above. Each delay line to be used now consists of a digital memory, i.e., a set of binary storage elements which may be programmed so as to advance the binary information which is fed in at one end of the set from the output of the array element, in an ordered sequence through the set of storage elements. At any particular point in the set the binary information may be observed and will represent the output of the element delayed by the number of the particular storage cell in the memory set multiplied by the advancing or clocking period used to propagate the information through the memory. A memory programmed in such a manner is commonly referred to as a shift register in computer terminology and many embodiments of such a device are now in common use.

Incorporation of digital techniques such as used in computers results in a number of advantages. The variation of component characteristics with temperature and age has very little effect in this type of circuitry and the end result is an instrument of high stability and reliability with respect to variation of the individual components. The use of digital processing provides for a normalized output wherein the energy appearing on a particular bearing output represents the ratio of this energy to all of the masking noise energy. Thus, the output is truly a signal-to-noise ratio output rather than an output proportional to either signal or noise alone. This normalization reduces the dynamic range requirements of equipments to be used in a detection system since variations in background noise of 10 to 100 times or more will not change the reference noise output of the system. The use of the digital shift register provides a time delay which is not subject to dispersion nor subject to attenuation. The magnitude of the time delay may be varied over a very wide range by simple setting of the clocking pulse rate. Because of the digital nature of the output of each stage of the shift register and because of the appreciable amount of power which may be drawn from any stage within the shift register, the summation of the various time delay signals may be accomplished at moderate power levels very uniformly with a simple summing matrix.

Figure 2:
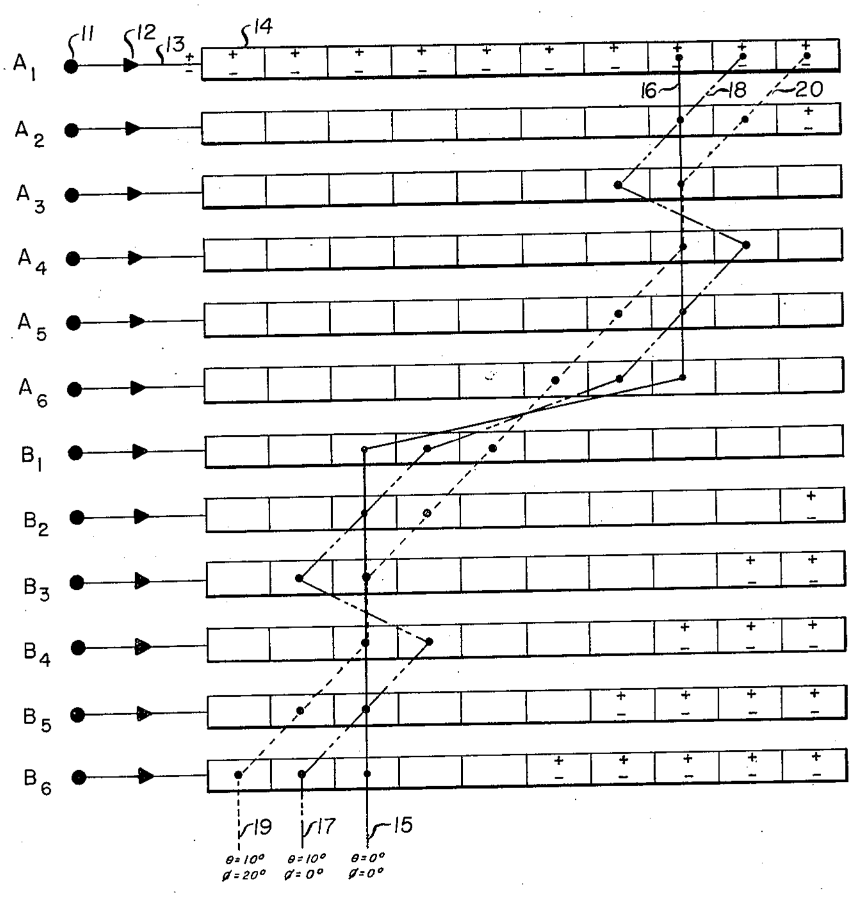
Figure 3:
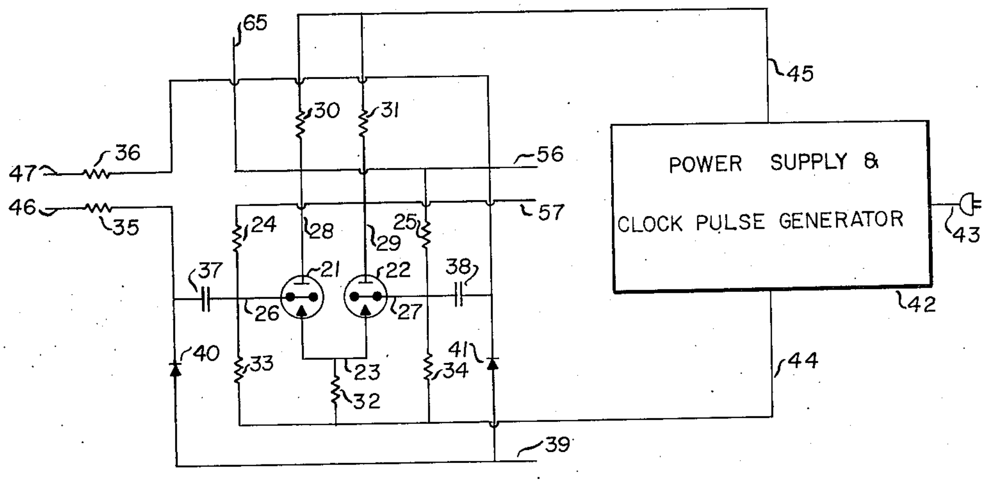
Figure 4:
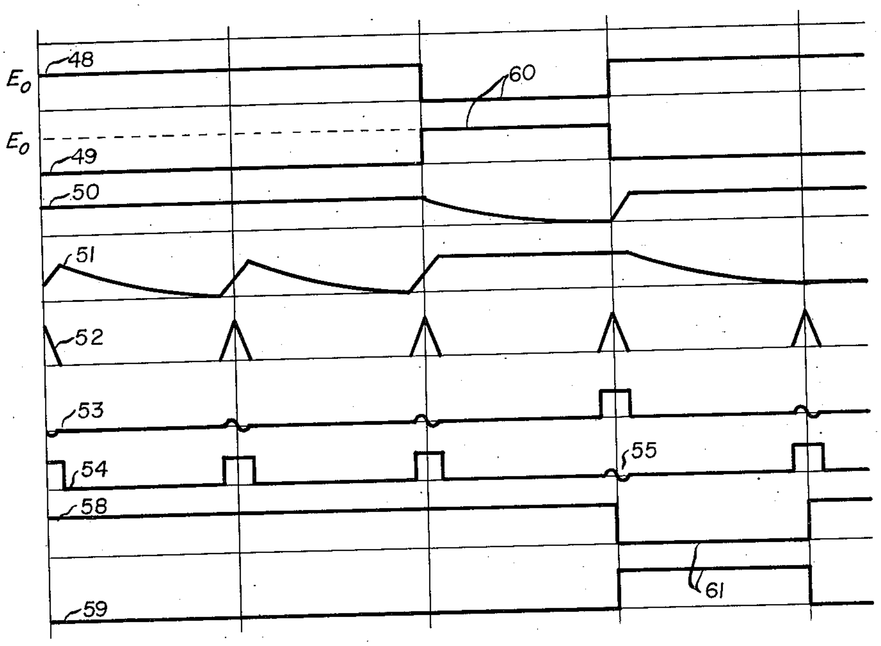
Figure 5:
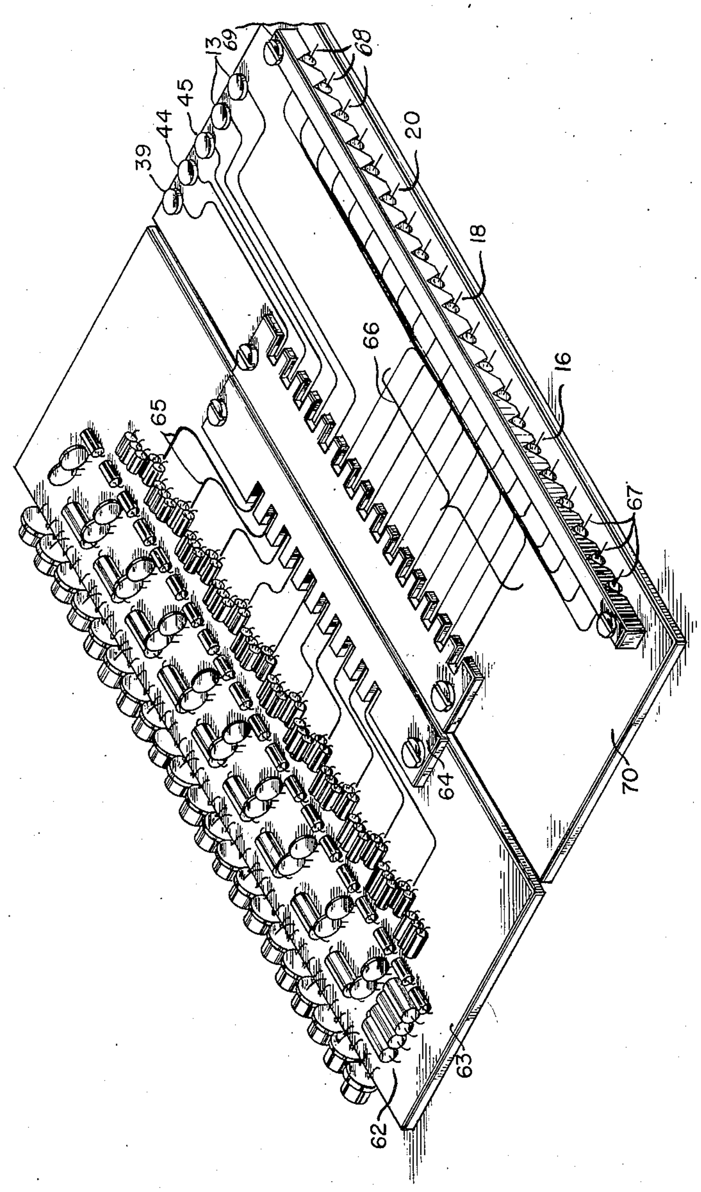
Figure 6:
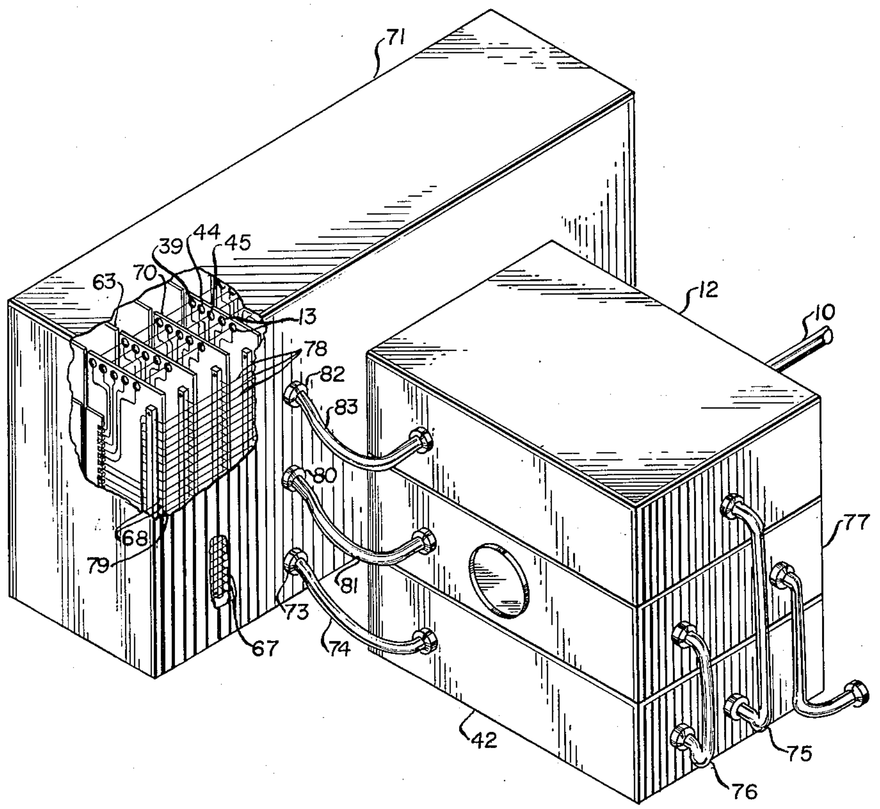
Figure 7:
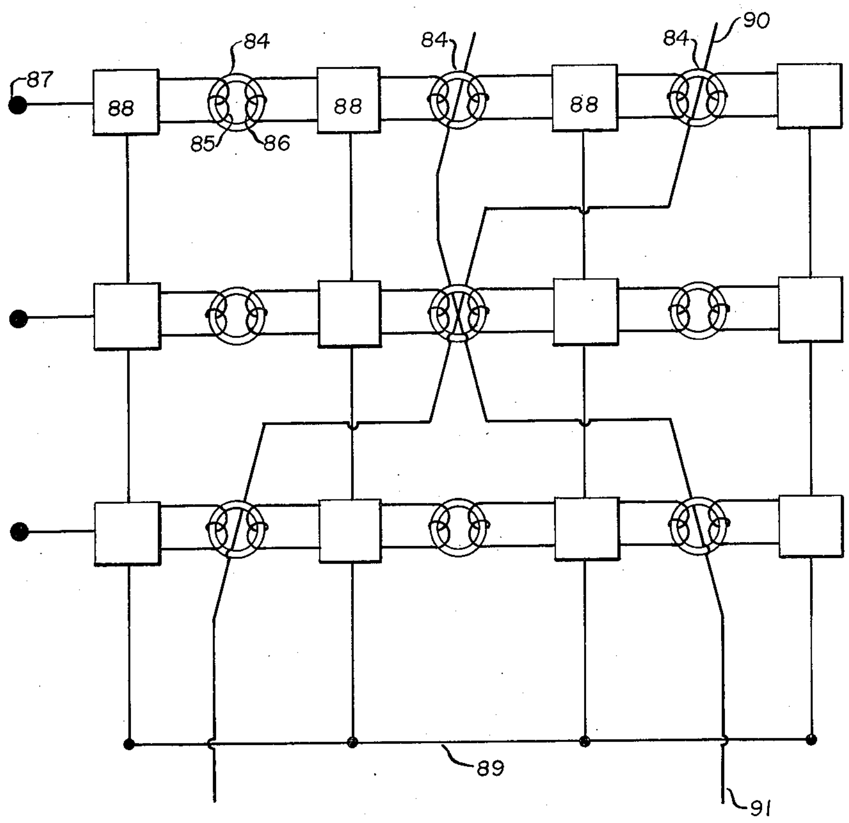
Figure 8:
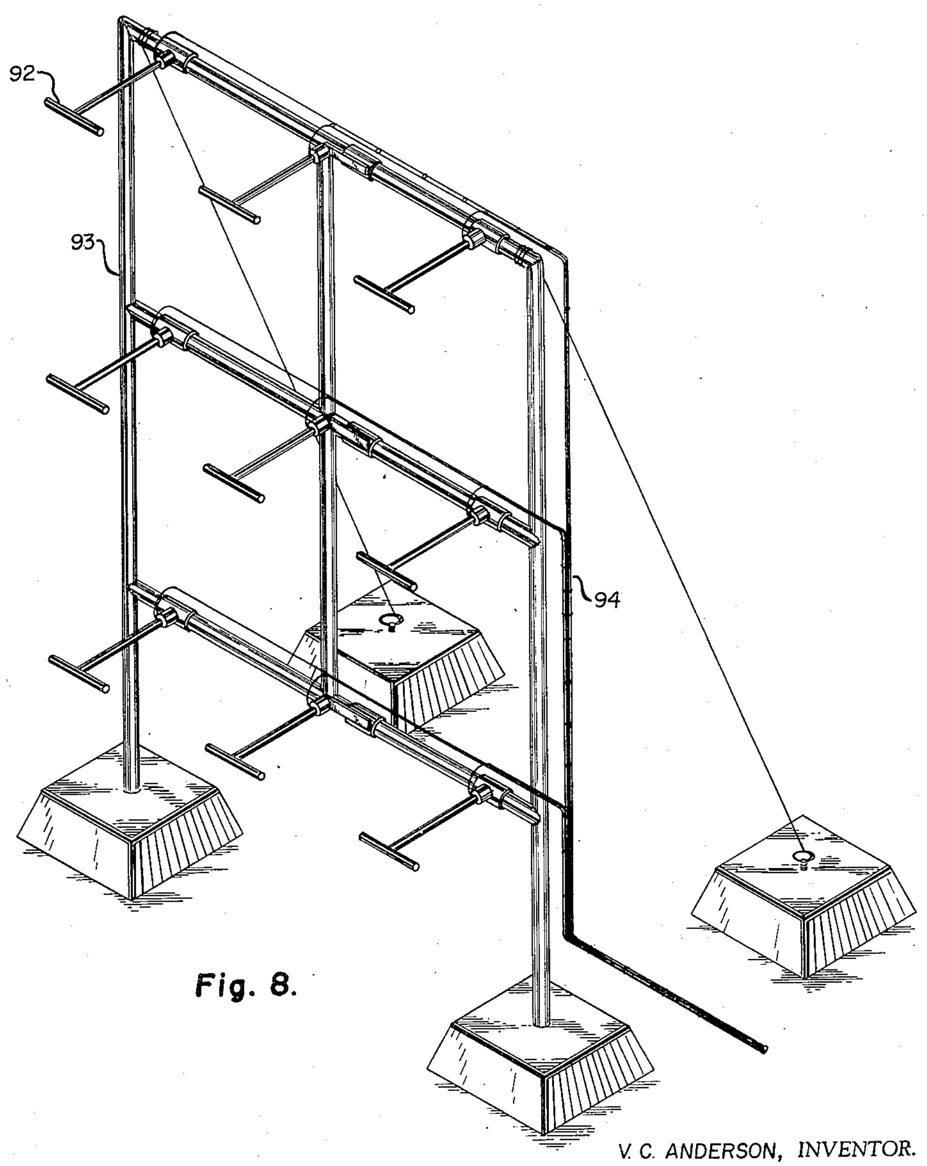
Figure 9:
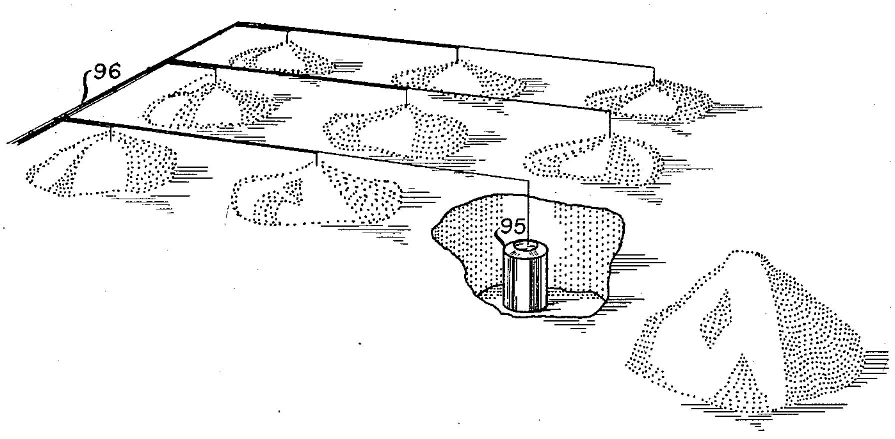

FIGURE 1 represents a typical array structure including 12 elements arranged in a cubic lattice. FIGURE 2 is a schematic representation of the method of interconnection of the shift register from the array elements to the bearing outputs. FIGURE 3 is a schematic diagram of a typical shift register stage used as a delay element. FIGURE 4 represents the waveforms of the circuit of FIGURE 3. FIGURE 5 is a drawing of a ten-element shift register board and associated matrix board to provide interconnections. FIGURE 6 shows the complete steering line assembly of the shift register and matrix boards. FIGURE 7 illustrates an alternate method using a magnetic core shift register. FIGURE 8 shows an alternate array for electromagnetic energy fields. FIGURE 9 shows an alternate array for seismic energy fields.

The array shown in FIGURE 1 is composed of transducer elements 1 and their associated electrical cable elements 2 fastened to a support frame 3 by clamps 4 in an arbitrary geometrical arrangement. The support frame 3 is provided with structural bracing 5 to maintain a rigid relative position of the transducer elements 1 and the entire array frame 3 is mounted on a base 6 anchored by concrete foundations 7 on the ocean bottom 8 so as to maintain the array at an optimum distance below the ocean surface 9.

The electrical signals from the transducers are combined into a multiconductor submarine cable 10 for processing in the manner shown in FIGURE 2. The individual signals symbolized by circles 11 are passed through conventional clipping amplifiers 12 to generate electrical signals having only two values of voltage (plus or minus) which are carried on busses 13 to the input of a shift register symbolized by sets of blocks 14. The outputs of the individual stages are interconnected to provide the proper phasing for a preferred direction of arrival. Three typical interconnections are shown. The interconnections for $\theta=0°$, $\phi=0°$, 15 is shown by wire 16; interconnections for $\theta=10°$, $\phi=0°$, 17 is shown by wire 18; interconnections for $\theta=10°$, $\phi=20°$, 19 is shown by wire 20. This last interconnection illustrates the manner in which both vertical and horizontal steering may be accomplished. The fact that exact values of time delays may not necessarily be realized for an arbitrary distribution of elements can be shown to have a negligible effect on the efficiency of the array for small signal-to-noise ratios as long as a sufficient number of delay steps are used per wavelength of the center frequency of the signal band to keep the average time delay error small (the example shown here utilizes 5 steps per wavelength).

One method of construction of the shift register stages, symbolized by blocks 14 is shown in FIGURE 3. This particular embodiment utilizes a pair of junction transistors 21 and 22 to achieve a saving in weight and size. These transistors 21 and 22 are connected with common emitters 23 in the bistable circuit of FIGURE 3. Feedback resistors 24 and 25 complete a positive feedback loop around the two transistors 21 and 22 which act as amplifiers providing a current gain between bases 26 and 27 and their respective collectors 28 and 29 thereby generating a voltage gain across collector resistors 30 and 31. A common emitter resistor 32 provides a voltage bias to the non-conducting transistor of the pair to provide a margin of safety to assure current cut-off in the transistor and to increase the switching speed of the circuit. Resistors 33 and 34 make the circuit insensitive to base leakage currents.

Information from the previous stage, i.e., a plus or a minus, is coupled through charging resistors 35 and 36 to storage capacitors 37 and 38. When the transfer is to be consummated a clocking pulse is applied to a clocking bus 39 which couples through diodes 40 and 41 to storage capacitors 37 and 38. Power for the stage and clock pulse drive is supplied from a conventional power supply and pulse generator 42 operating off of power mains 43 between a ground bus 44 and clocking bus 39.

The operation of this stage is illustrated by the waveforms of FIGURE 4. The inputs to a shift register stage as they appear at points 46 and 47 of FIGURE 3 are shown by waveforms 48 and 49 respectively. These waveforms passing through charging resistors 35 and 36 generate voltages on storage capacitors 37 and 38 and have the waveform illustrated by the numerals 50 and 51 respectively. The clock pulses appearing on clock pulse bus 39 have a waveform 52. The back-biasing of diodes 40 and 41 by capacitors 37 and 38 results in current waveforms to bases 26 and 27 shown by waveforms 53 and 54 respectively. These triggering current pulses 53 and 54, the inverted state of the pair is shown at 55, serve to establish the state of the bistable stage producing resulting waveforms 58 and 59 respectively as the output of the shift register stage on leads 56 and 57. It can be seen that the information stored in the previous stage has been transferred sequentially into the stage under discussion, i.e., the change of state 60 appearing in the third clock pulse interval of waveforms 48 and 49 (representing the state of the previous stage) has been transferred to the stage shown in the fourth clock pulse interval 61 of waveforms 58 and 59.

The physical configuration of the preferred embodiment of a shift register is shown in FIGURE 5 along with a preferred embodiment of a mixing matrix. Shift register components 62 are mounted on a printed circuit board 63 which accommodates the ten shift register stages which are used in this example. As mentioned previously, the exact number of shift register stages required will depend on the physical configuration or overall size of the array structure (FIGURE 1) and frequency spectrum of the signal to be observed. Electrical connection of the shift register is provided through a plug 64 which makes all the necessary electrical connections including input signal 13, power 44 and 45, clock pulse 39 and an individual output 65 (FIGURE 3) from each shift register stage. The set of output leads 66 is wired to the appropriate mixing resistors of a set of resistors 67 to provide the proper time delay for the interconnections illustrated by 16, 18 and 20 of FIGURE 2. These interconnections are shown as three of a set of outputs which are right-hand terminals 68 of the resistor set 67. The set of resistors is held in place by a clamp 69 on a matrix board 70.

Individual shift register matrix boards 63 and 70 are assembled in a chassis 71 as shown in FIGURE 6 to form a complete steering line assembly. Busses 39, 44 and 45 supply power and clock pulses to the individual boards. These busses are electrically connected through a plug 73 to a cable 74 which is connected to power supply and clock pulse generator 42 which also supplies power through a cable 75 to clipping amplifiers 12 and through a cable 76 to a display chassis 77. The matrix interconnections are made by parallel output busses 78 connected to output terminals 68 of the set of resistors 67. Bearing output busses 78 are connected by wires 79 through a plug 80 and a cable 81 to display console 77 which provides a suitable display of the average power output of each of the bearing output busses 78. Inputs 13 to the shift register stages are introduced through a plug 82 and a cable 83 from clipping amplifiers 12 which dichotomize the individual array element signals arriving on cable 10.

An alternate embodiment for the digital array steering is shown schematically in FIGURE 7. Here magnetic cores 84 are used as memory elements instead of the transistors 21 and 22 of FIGURE 3. The magnetic cores possess square loop hysteresis characteristics and the binary information is stored as the direction of permanent magnetization flux in the cores. Each core is provided with an input winding 85 and a transfer winding 86, the input winding being connected to a transfer circuitry 88 driven by a clocking pulse from bus 89. The transfer circuit derives its input either from transfer winding 86 of the previous core or from the output of clipping amplifiers 87. Transfer circuitry 88 serves to establish the magnetization in memory core 84 with a read-in pulse, the presence of which is controlled by the input which it has received previously from the transfer winding of previous core 86. Transfer circuitry 88 also supplies an interrogation pulse to all cores simultaneously thereby transferring the information stored in the core to the next succeeding transfer circuit as a pulse or no-pulse on transfer winding 86 depending on whether the state of magnetization of the core was reversed or not reversed respectively by the interrogation pulse on winding 85. Thus, it can be seen that the binary information represented by the state of magnetization of the cores is transferred sequentially down the succession of cores comprising the magnetic core shift register in a manner analogous to the transfer of information described in FIGURE 3 above. The summation of the different shift register channels is now accomplished by a single turn coil formed of a wire 90 linking the desired cores representing delay positions on the various channels. The output of this wire then consists of a pulse which is the sum of the output pulses of the cores linked by wire 90 in which the state of magnetization was changed by transfer circuitry 88. Other bearing interconnections may be made without interfering with the original one as illustrated by wire 91. The amplitude of these output pulses appearing on these interconnecting wires typified by 90 and 91 are analogous to the outputs appearing on the interconnecting wire 78 of FIGURE 6.

FIGURE 8 shows an alternate array for use in an electromagnetic energy field. Electromagnetic antenna elements 92 are mounted in frame 93 to establish appropriate spacings. The outputs of the individual antennas are transmitted through a multiconductor cable 94, which is analogous to cable 10 of FIGURE 1, to phasing equipment of the type shown in FIGURE 6.

FIGURE 9 shows an alternate array for use in seismic energy fields. Geophones 95 are buried in the ground and connected through multiconductor cable 96 to phasing equipment of the type shown in FIGURE 6.

I claim:

1. A directional energized detection apparatus comprising a plurality of spatially distributed energy sensing means, a plurality of polarity sensitive converters, said converters having an input and an output, electrically connecting each of said energy sensing means to the input of a separate one of said converters, a plurality of binary storage means, each of said binary storage means consisting of a plurality of individual series-connected storage units, second connecting means, connecting the output of each of said converters to a separate one of said binary storage means, signal shifting means connected to each of said individual storage units, said shifting means having an output adapted to shift any binary information stored in said individual storage units to the next successive individual storage unit, and summing means, third connecting means connecting said summing means to predetermined individual storage units, whereby any information stored in said individual storage units is electrically summed.

2. The apparatus of claim 1 wherein each of said individual storage units comprise a bistable electronic circuit.

3. The apparatus of claim 1 wherein each of said individual storage units comprises a magnetic memory core.

4. The apparatus of claim 1 wherein said plurality energy sensing means comprises an antenna array for receiving electromagnetic energy.

5. The apparatus of claim 1 wherein said plurality of sensing means comprises a transducer array for receiving acoustical energy.

6. The apparatus of claim 1 wherein said plurality of sensing means comprises a transducer array for receiving seismic energy.

7. A direction finding apparatus comprising a plurality of spatially distributed energy sensing means, a plurality of polarity sensitive converters, said converters having an input and an output, connecting means electrically connecting each of said energy sensing means to the input of a separate one of said converters, a plurality of shift registers, second connecting means, connecting the output of each of said converters to a separate one of said shift registers, a shifting means, said shifting means connected to each of said shift registers, summing means, third connecting means connecting said summing means to said shift registers, whereby any information stored in said shift registers is electrically summed.

8. The apparatus of claim 7 wherein said plurality energy sensing means comprises an antenna array for receiving electromagnetic energy.

9. The apparatus of claim 7 wherein said plurality of sensing means comprises a transducer array for receiving acoustical energy.

References Cited in the file of this patent

UNITED STATES PATENTS 2,897,351 Melton ---------------- July 28, 1959

OTHER REFERENCES

"Electronics," January 29, 1960, pp. 67–69.